United States Patent [19]
Torochkov et al.

[11] 3,829,042
[45] Aug. 13, 1974

[54] INSTALLATION FOR PNEUMATIC CONVEYANCE OF CONTAINERIZED LOADS THROUGH A TUBE

[76] Inventors: Ivan Mikhailovich Torochkov, ulitsa Gorogo, 41, kv. 99, Moscow; Georgy Samsonovich Kobulia, Prospekt Chavchvadze, 11, kv. 9, Tbilisi; Adolf Martitsovich Alexandrov, Federativny Prospekt, 6, korpus 3, kv. 8, Moscow; Ippolit Davidovich Suladze, Prospekt Chavadze, 11, kv. 41, Tbilisi; Leonid Arkadievich Matskin, Krasnoarmeiskaya ulitsa, 26, korpus 2, kv. 23, Moscow; Zurab Dmitrievich Gambashidze, 1 Tupik Arakisnvill, 8, Tbilisi; Ruben Dzhangirovich Balayan, Ljubertsy, Volkovsky ulitsa, 9, kv. 31, Moskovskaya Oblasti; Jury Abramovich Tsimbler, Sojuzny Prospekt, 10, kv. 261, Moscow; Avtandil Semenovich Kakhniashvili, ulitsa Eliava, 37, kv. 41, Tbilisi; Vladimir Efimovich Aglitsky, Zatsepsky Val, 6/13, kv. 61, Moscow, all of U.S.S.R.

[22] Filed: Mar. 23, 1972

[21] Appl. No.: 237,509

Related U.S. Application Data

[63] Continuation of Ser. No. 106,017, Jan. 13, 1971, abandoned.

[30] Foreign Application Priority Data
Jan. 20, 1970  U.S.S.R. .............................. 1395307

[52] U.S. Cl. .......................... 243/3, 243/19, 243/31
[51] Int. Cl. ...................... B65g 51/34, B65g 51/36
[58] Field of Search ............................. 241/1, 5–7, 241/30, 31, 19, 29, 2–4; 104/26 R, 27

[56] References Cited
UNITED STATES PATENTS
| 393,584 | 11/1888 | Robinson | 243/31 |
| 1,942,154 | 1/1934 | Snyder | 104/26 R X |
| 3,337,159 | 8/1967 | Hoehmann | 243/29 |

FOREIGN PATENTS OR APPLICATIONS
| 1,080,026 | 4/1960 | Germany | 243/5 |

*Primary Examiner*—Evon C. Blunk
*Assistant Examiner*—W. Scott Carson
*Attorney, Agent, or Firm*—Holman & Stern

[57] ABSTRACT

An installation for the pneumatic conveyance of containerized loads through a tube in which the main tube connecting the loading and unloading stations is divided into two sections with a by-pass section therebetween. The by-pass section consists of two parallel tubes which are connected alternately to the sections of the main tube by means of switches located on both sides of the parallel tubes.

2 Claims, 6 Drawing Figures

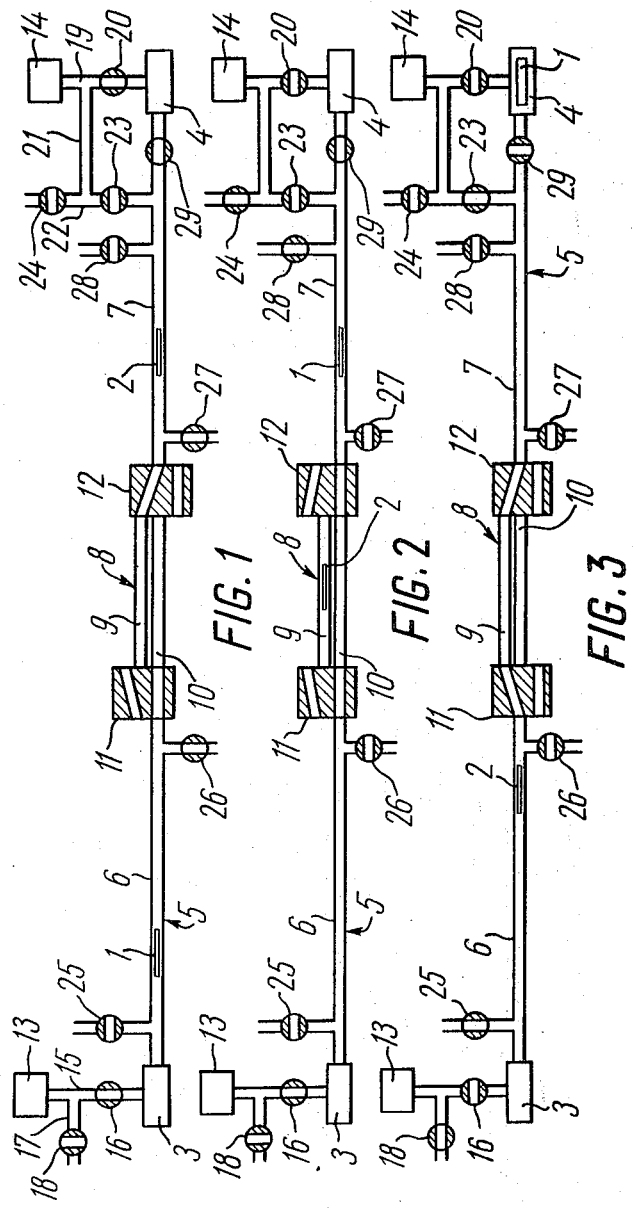

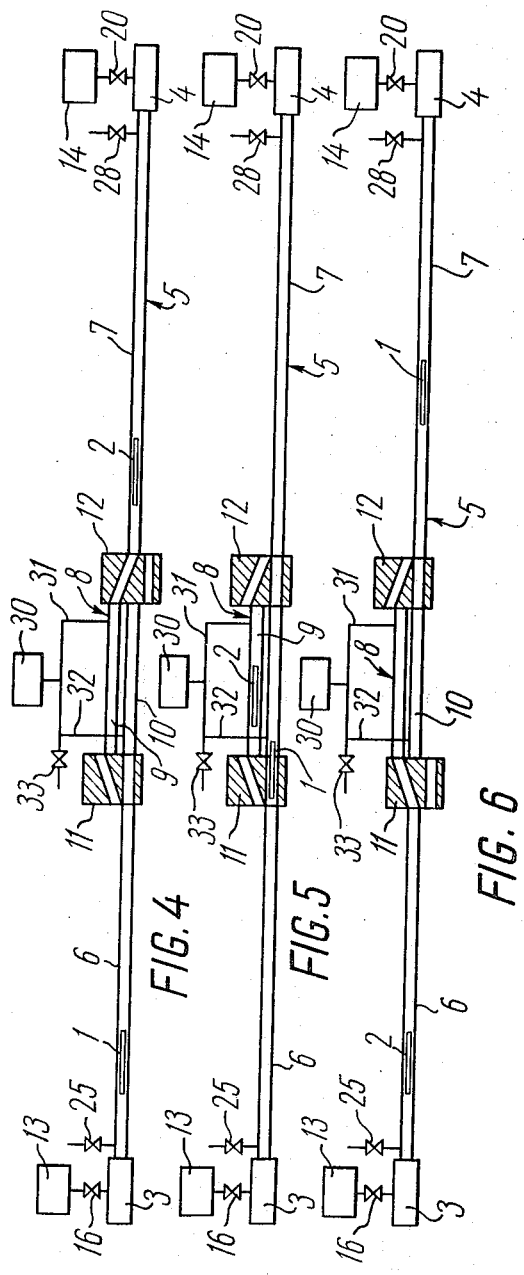

INSTALLATION FOR PNEUMATIC CONVEYANCE OF CONTAINERIZED LOADS THROUGH A TUBE

This is a continuation of application Ser. No. 106,017 filed Jan. 13, 1971, now abandoned.

BACKGROUND OF THE INVENTION

The present invention relates to installations for the pneumatic conveyance of loads through a tube and more particularly to installations for the pneumatic conveyance of containerized loads through a tube.

PRIOR ART

Widely known in the art are single-tube installations for the pneumatic conveyance of containerized loads. These prior installations comprise a loading station and an unloading station with, the two stations being interconnected by a main tube. The tube intended for the conveyance of containers is in communication with a source of compressed gas. The sources of compressed gas are constituted by compressors or air blowers located at the ends of the main tube.

The loaded and empty trains of containers in these installations move alternately in opposite directions thus resulting in a comparatively low efficiency.

An object of the present invention is to eliminate the aforesaid disadvantages.

The main object of the invention is to provide an installation for the pneumatic conveyance of containerized loads through a single main tube which allows a simultaneous movement of at least two container trains in opposite directions.

SUMMARY OF THE INVENTION

This object is accomplished by providing an installation for the pneumatic conveyance of containerized loads through a tube comprising a loading station, an unloading station, the two stations being interconnected by the main tube which communicates with sources of compressed gas for the propulsion of the containers in which, according to the invention, the main tube is divided into two sections with a by-pass section therebetween, with the by-pass section consisting of two parallel tubes connected with the sections of the main tube via switches located at both ends of the parallel tubes.

It is expedient that the by-pass section be located nearer to the loading station. Such a location of the by-pass section on the main tube will allow, in addition to the increased speed of one or more containers, a reduction in the time required by these containers to move from the by-pass section to the loading station and, as a consequence, will further increase the efficiency of the installation.

For longer conveying distances it is practicable that the by-pass section be placed in communication with an additional source of compressed gas. This arrangement will increase still further the efficiency of the installation due to an almost complete elimination of the time lost to the stops of the loaded and empty trains in motion.

The installation for the pneumatic conveyance of containerized loads in accordance with the present invention is simple to manufacture, reliable in operation, and is approximately twice as efficient as the known single-tube installations.

Given below is a description of the present invention by way of example with reference to the accompanying drawings, in which:

BRIEF DESCRIPTION OF THE DRAWING

FIG. 1 is a schematic view of the installation for the pneumatic conveyance of containerized loads through a tube, according to the invention;

FIG. 2 is a similar view, showing the loaded train moving through the by-pass section;

FIG. 3 is a view similar to FIG. 1, showing the empty train which has left the by-pass section;

FIG. 4 is a schematic view of the installation for the pneumatic conveyance of containerized loads comprising an additional source of compressed gas according to the invention (initial period of movement);

FIG. 5 is a view similar to FIG. 4, showing the trains moving through the by-pass section; and FIG. 6 is a view similar to FIG. 4, showing the trains which have left the by-pass section.

DETAILED DESCRIPTION OF THE INVENTION

The installation for the pneumatic conveyance of loads in container trains 1 (FIGS. 1–3) and 2 comprises a loading station 3 and an unloading station 4. These stations are interconnected by a main tube 5 which is divided into two sections 6 and 7 with a by-pass section 8 therebetween. The by-pass section 8 consists of two parallel tubes 9 and 10, each having a diameter equal to that of the main tube 5. The by-pass section 8 must be longer than the container train and its length must be sufficient for braking the empty train 2 in the tube 9.

To reduce the time required by the empty train 2 for moving through the section 6 of the main tube 5, the by-pass section 8 must be located nearer to the loading station 3.

Located on both sides of the by-pass section 8 are switches 11 and 12 connecting the tubes 9 and 10 with the corresponding sections 6 and 7 of the main tube 5.

At the ends of the main tube 5 are located sources of compressed gas 13 and 14 which are constituted, in this example, by turboblowers which provide for the propulsion of the container trains 1 and 2. The compressed gas source 13 communicates, by a tube through a valve 15 and 16 with the main tube 5 while a tube 17 and valve 18 provide communication between this source and another consumer of compressed gas, or with the atmosphere.

The compressed gas source 14 communicates, by a tube 19 and valve 20 with the main tube 5 while tubes 21 and 22 provide communication between this source via valves 23 and 24 correspondingly with the main tube 5 and another consumer of compressed gas or the atmosphere. The main tube 5 is in communication with the atmosphere through valves 25, 26, 27 and 28.

The main tube 5 is provided with a gate 29 in the zone of the unloading station 4, between the tubes 19 and 22; when open, the gate 29 permits a free passage of the trains 1 and 2.

If the installation has an additional source of compressed gas 30 (FIGS. 4–6), the latter communicates, through tubes 31 and 32 respectively with the tubes 9 and 10 of the by-pass section 8, while valve 33 places the source in communication with the atmosphere. The valve 33 serves also for discharging gas into the atmosphere from the tubes 9 and 10.

The use of the additional source of compressed gas is necessary in case of a considerable distance between the loading station 3 and unloading station 4. This eliminates almost completely the idle time of the empty train 2 and loaded train 1 in the course of their movement.

The installation for the pneumatic conveyance of containerized loads functions as follows;

After the loading and unloading operations, the loaded train 1 and empty train 2 are propelled by the compressed gas delivered from the sources 13 and 14 from the stations 3 and 4 towards each other in the direction of the by-pass section 8 (FIG. 1). The valves 18, 25, 28, 24, 23 are closed and the valves 16, 26, 27 and 20 are open and the gate 29 is open.

To provide the requisite conditions for the non-stop movement of the loaded train 1 through the tube 10 of the by-pass section 8, the empty train 2 arrives with a certain time lead in the tube 9 and stops there (FIG. 2); this is possible due to the special location of the by-pass section 8 and to adequate selection of the travelling speed of the train 2. The switch 12 is shifted, the valves 26, 27 and 20 closed and the valves 28 and 24 opened. The loaded train 1 continues its movement without interruption towards the unloading station 4 being propelled by the source of compressed gas 13. The source of compressed gas 14 is either disconnected or discharges the gas freely through the valve 24.

Upon arrival of the loaded train 1 at the unloading station 4 (FIG. 3) the switches 11 and 12 are shifted over, the valves 16, 28, 24 and the gate 29 closed which is followed by the opening of the valves 18, 25 and 23. The empty train 2 is propelled from the by-pass section 8 by the source of compressed gas 14 towards the loading station 3. The source of compressed gas 13 is either disconnected or discharges the gas freely through the valve 18.

The installation with an additional source of compressed gas 30 functions as follows:

After simultaneous loading and unloading operations, the loaded train 1 and empty train 2 start from the stations 3 and 4 towards each other in the direction of the by-pass section 8, being propelled by the sources of compressed gas 13 and 14 (FIG. 4). The valves 25 and 28 are closed and the valves 16, 20 and 33 are opened.

After the empty train 2 arrives in the tube 9 with a certain time lead (FIG. 5), the switch 12 is shifted over, thus making for the free passage of the loaded train 1 through the tube 10 of the by-pass section 8. As soon as the loaded train 1 arrives in the tube 10, the switch 11 is shifted over, the sources of compressed gas 13 and 14 are cut off, the valves 16, 20, 33 closed, the valves 25 and 28 opened and the source of compressed gas 30 is turned on. Being propelled by the source of compressed gas 30, the trains 1 and 2 continue their movement in opposite directions towards the loading station 3 and unloading station 4 (FIG. 6).

Thus, by performing simultaneously the loading and unloading operations and ensuring simultaneous movement of the empty and loaded trains towards each other, the single-tube installation becomes by far more efficient thus dispensing with the necessity for the double-tube installation. In addition, since each source of compressed gas ensures the movement of the trains through the sections located between the by-pass section and the loading and unloading stations, the pressure in the main tube becomes lower and the travelling speed of the trains becomes more uniform.

If necessary, the number of by-pass sections in the installations with additional sources of compressed gas can be increased.

What is claimed is:

1. An installation for the pneumatic conveyance of heavy containerized loads through a tube comprising: a loading station; an unloading station; a main tube consisting of two sections, one section adjoining said loading station and the other section adjoining said unloading station; a by-pass section made up of two parallel tubes for the passing of containers moving in opposite directions, said by-pass section being built into said main tube between said two sections; switches arranged at both ends of said by-pass section and connecting its two parallel tubes in turn with said sections of the main tube; sources of compressed gas disposed at the ends of the main tube and communicating therewith for propelling the containers therethrough from the loading and unloading stations to the by-pass section; and an additional source of compressed gas connected to the tubes of the by-pass section for the simultaneous propulsion of the containers from the by-pass section in opposite directions to the unloading and loading stations.

2. The installation according to claim 1 wherein the by-pass section is located on the main tube, nearer to the loading station.

* * * * *